May 3, 1966  P. ANGENIEUX  3,249,008
GUIDE MEANS FOR A BARREL CARRYING AN OPTICAL ELEMENT
Filed July 19, 1962  3 Sheets-Sheet 1
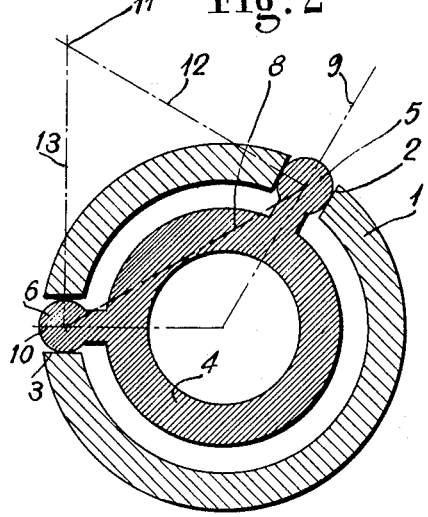
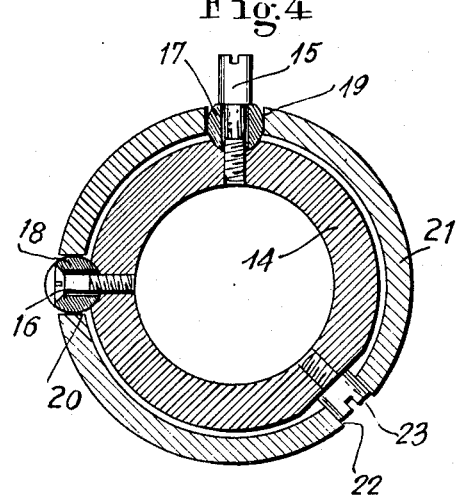
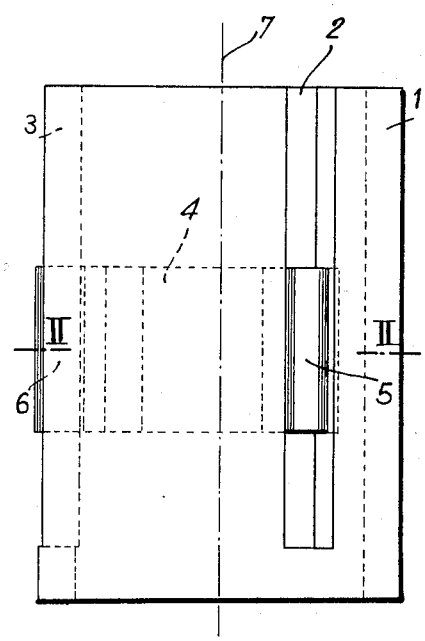
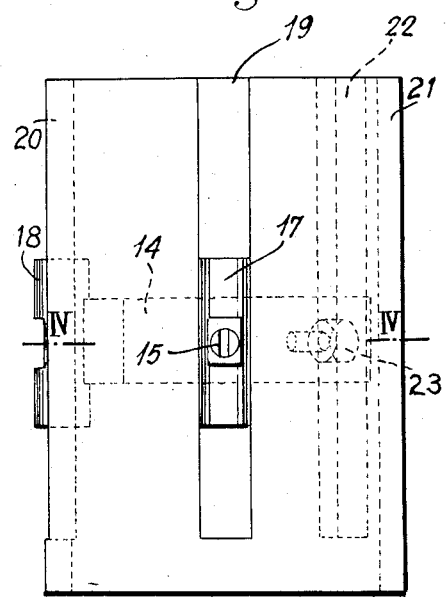
Inventor
Pierre Angenieux
by: Michael S. Striker May 3, 1966  P. ANGENIEUX  3,249,008
GUIDE MEANS FOR A BARREL CARRYING AN OPTICAL ELEMENT
Filed July 19, 1962  3 Sheets-Sheet 2

Inventor
Pierre Angenieux
by:
Michael S. Striker
Attorney

May 3, 1966   P. ANGENIEUX   3,249,008
GUIDE MEANS FOR A BARREL CARRYING AN OPTICAL ELEMENT
Filed July 19, 1962   3 Sheets-Sheet 3
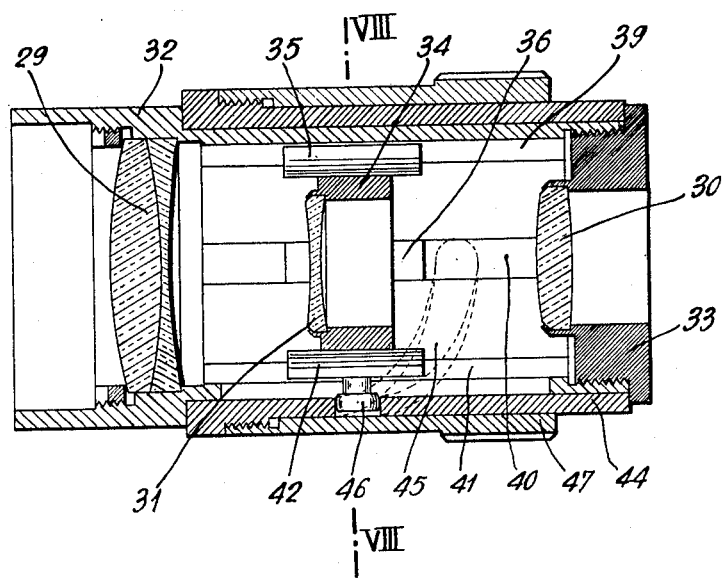
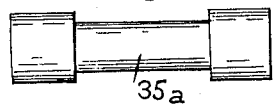
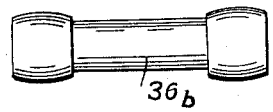
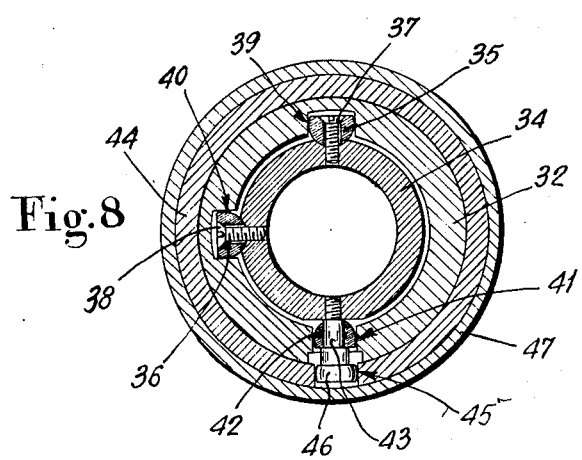
Inventor
Pierre Angenieux
by: Michael S. Striker
Attorney United States Patent Office 3,249,008
Patented May 3, 1966

3,249,008
GUIDE MEANS FOR A BARREL CARRYING
AN OPTICAL ELEMENT
Pierre Angenieux, 27 Rue du Cherche-Midi,
Paris, France
Filed July 19, 1962, Ser. No. 210,955
Claims priority, application France, Aug. 4, 1961,
870,018
12 Claims. (Cl. 88—57)

This invention relates to optical devices.

It is the essential object of the present invention to provide guide means permitting the longitudinal displacement of a barrel carrying an optical element.

It is known that variable focal length lens systems comprise one or more optical members to which axial movements of translations are usually impressed. A mechanical device capable of producing these displacements must be capable of constantly centering the optical members during the movements, but as the barrels supporting these optical elements are usually relatively thin, it is particularly difficult to guide them inside a cylindrical tube fitting on the outer surface of the barrels.

The present invention provides a device dispensing with the conventional fitting of a cylindrical surface on another cylindrical surface, and according to this invention this problem is solved by using guide members disposed on the outer periphery of the barrel.

To this end, the present invention provides a guiding device consisting of a hollow support formed with two longitudinal rectilinear grooves or slots, a barrel disposed within the support cavity and equipped with the optical member or element, two guide members disposed on the outer periphery of said barrel and engaged in said support grooves or slots this device being characterized in that the two sides of each longitudinal groove or slot of the support are flat parallel surfaces, each guide member being in smooth frictional contact with these surfaces and consisting of two coaxial solids of revolution inscribed in a cylinder of which the common axis extends longitudinally in relation to the barrel.

The guide means according to this invention will be better understood from the following description made with reference to the accompanying drawings, in which:

FIGURE 1 is a diagrammatic plane view from above showing a device illustrating the basic principle of the guiding device of this invention;

FIGURE 2 is a cross section taken upon the line II—II of FIG. 1;

Figure 6:
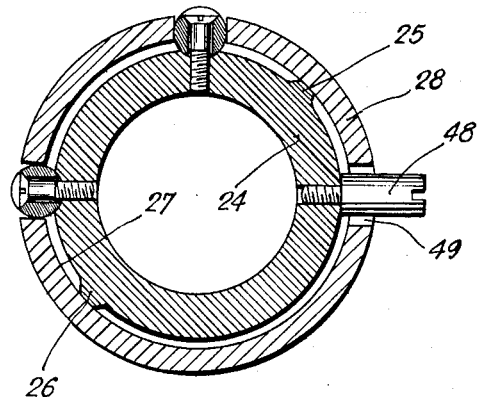
Figure 5:
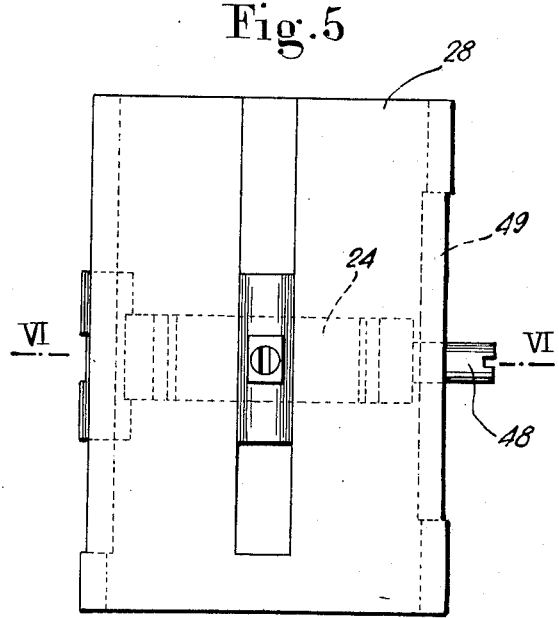

FIGURES 3 and 4, on the one hand, and FIGURES 5 and 6, on the other hand, are similar views showing diagrammatically two typical forms of embodiment of the guiding device of this invention, FIGS. 4 and 6 being sections taken upon line IV—IV of FIG. 3 and line VI—VI of FIG. 5, respectively;

FIGURE 7 is an axial section showing a typical practical embodiment of a guiding device according to this invention;

FIGURE 8 is a cross-section taken upon the line VIII—VIII of FIG. 7, and

FIGURES 9 and 10 are side elevational views showing two different forms of embodiment of the guide members contemplated in the device of this invention.

As already stated, FIGS. 1 and 2 relate to a device shown diagrammatically to illustrate the principle on which the present invention is based. To simplify the disclosure, no optical element is shown, the figures showing only the barrel adapted to receive this element. The fixed tubular support 1 has formed therein two parallel-sided longitudinal grooves or slots 2, 3. Inside this tube 1 the barrel 4 carries on its outer periphery a pair of cylindrical rods 5, 6 rigid with the barrel and having their longitudinal axes parallel to the barrel axis 7. The cylindrical rods 5, 6 are in smooth frictional contact with the inner walls of the grooves 2, 3 of the fixed support, respectively. With this arrangement the barrel has two degrees of freedom: on the one hand, it is free to slide longitudinally and on the other hand it can be transversely displaced so that its axis remains constantly parallel to itself. This second degree of freedom can be checked by examining in FIG. 2 of the drawings which movement can be imparted to the barrel section in relation to the section of the fixed tubular support. It will be seen that this movement is comparable to that of a movable plane solid with a segment of straight line 8 having its ends caused to bear on two fixed axes 9, 10. The momentary centre of rotation lies at 11 at the intersection of the straight lines 12 and 13 which are perpendicular to the aforesaid axes 9 and 10, respectively. It is clear that if this possibility of movement of the barrel in relation to the fixed support were eliminated the barrel could move only in a longitudinal direction, with its axis stationary. This result is obtained by simply utilizing a third guiding element.

On the other hand, it is worth pointing out that the axes of the two cylindrical rods 5, 6 may depart substantially from an absolute parallelism with the barrel axis. It is furthermore interesting to note that even if the axes of the cylindrical rods 5, 6 are not parallel to each other it is still possible to fit the assembly consisting of the barrel 4 and rods 5, 6 in the fixed support 1, and that in this case the third guiding element becomes theoretically useless.

However, from a practical point of view it is interesting to approach a true parallelism for reasons dictated by manufacturing requirements and also because in practice the elimination of the third guiding element could only be obtained by using cylindrical rods 5, 6 of which the axes departed strongly from this true parallelism, this solution being obviously attended by many inconveniences, notably a substantial increase in the over-all dimensions of the device.

The only purpose of these remarks is to prove that it is not necessary to use any degree of precision in the assembly of a pair of cylindrical rods such as 5, 6 on a barrel such as 4.

Moreover, it may be noted that this device is advantageous in that it permits the use of relatively long guide members, thus ensuring a reliable, efficient guiding action while avoiding any risk of jamming the device.

FIGURES 3 and 4 illustrate a device comprising a third guide member in addition to the component elements described hereinabove. As in the preceding case, no optical element is shown in these figures. This device comprises a barrel 14 having secured on its outer periphery by means of screws 15, 16 a pair of cylindrical rods 17, 18. These rods have their axes substantially parallel to the barrel axis and are in smooth frictional contact with the inner parallel faces of a pair of longitudinal grooves 19, 20 formed through the wall of the fixed tubular support 21. Moreover, this fixed tubular support 21 has formed therein a third longitudinal groove 22 engaged by a stud or like member 23 rigid with the barrel. Thus, this barrel is free to move axially in the support, its axis remaining in a fixed position. As the longitudinal movements of the barrel are usually controlled from the outside, the screw 15 securing the cylindrical rod 17 on the barrel has a head long enough to protrude externally from the fixed tubular support 21.

FIGURES 5 and 6 illustrate a device of same character but wherein the barrel axis is held against motion by different means. To hold the barrel 24 against transverse movement this barrel is formed with a pair of fingers or ribs 25, 26 engaging the inner surface of the bore 27 of the fixed tubular support 28, thus securing the barrel axis against transverse movement, but it is clear that other means may be used to this end without departing from the spirit and scope of the invention, which consists essentially of the device illustrated in FIGS. 1 and 2 of the drawings. Moreover, it may be noted that, in the device shown in FIGS. 5 and 6, there is provided a stud 48 solid with the barrel 24 and extending freely through a slot 49 formed in the fixed tubular support 28 so that the axial movements of the barrel may be controlled by acting upon this stud through any suitable and known means.

FIGURES 7 and 8 illustrate a typical form of embodiment of a device constructed according to the teachings of this invention. In this example, a fixed tubular support 32 carries at the front an optical element 29 and at the rear an optical element 30 fitted in a fixed barrel 33, these two optical elements being stationary while a lens element 31 is axially movable. To this end this lens element 31 is mounted in a movable barrel 34 receiving on its outer periphery a pair of cylindrical rods 35, 36 secured on this movable barrel by means of screws 37 and 38. The axes of these cylindrical rods are substantially parallel to the optical axis of the lens system. The fixed tubular support 32 is formed with a pair of parallel-faced longitudinal grooves 39, 40 engaged in smooth frictional contact by the corresponding cylindrical rods 35 and 36. Moreover, a slot 41 is formed through the wall of the fixed tubular support 32 and this slot is engaged also with a smooth frictional contact by a cylindrical guide member 42. This guide member 42 is loosely mounted on the plain shank 43 of a shouldered screw rigid with the movable barrel 34. Thus, this guide member 42 may assume the proper position and engage with a smooth frictional contact the walls of slot 41 when the cylindrical rods 35 and 36 are introduced into the grooves 39 and 40, whereby the movable barrel 34 is held against rotation but allowed to slide longitudinally within the fixed tubular support 32. Externally of this fixed tubular support 32 a cylindrical sleeve 44 is fitted for rotation thereabout. It comprises a cam groove 45 engageable by a stud 46 consisting of the head of screw 43. A control ring 47 rigid with the aforesaid cylindrical sleeve 44 surrounds the latter. Thus, by rotating the control ring 44 the operator may rotate the cylindrical sleeve 44 and the combined action of stud 46, cam-groove 45 and slot 41 permits the longitudinal displacement of the movable barrel 34 of which the axis is nevertheless constantly kept in a fixed position.

This typical form of embodiment was given only to illustrate the invention but should not be construed as limiting same. Generally, the invention applies to a variable focal-length lens system wherein two or more optical members are axially movable.

Moreover, it should be emphasized that the cylindrical rods such as 35 and 36 may be formed with a narrower intermediate portion. FIG. 9 shows a rod 35a of this character of which only the end portions are used for guiding purposes. This shape may be particularly advantageous when the rods are very long, so that the precision machining thereof is substantially facilitated. It is even possible, at the limit, as shown in FIG. 10, to reduce the contact area between the rod and the sides of the groove receiving same. In this case the rods consist of two coaxial solids of revolution of which the common axis is parallel to the axis of the movable barrel on which they are secured.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. In an optical device having a predetermined optical axis, in combination, an outer stationary tubular support having a longitudinal axis substantially coinciding with the optical axis, said tubular support being formed with a pair of elongated cutouts angularly displaced with respect to each other about the optical axis, extending generally parallel thereto, and communicating with the interior of said tubular support, each of said cutouts being defined at least in part by a pair of flat parallel surfaces of said support extending substantially parallel to the optical axis; an optical element having an optical axis coinciding with said predetermined optical axis of the device; an inner barrel located within and spaced from said tubular support and carrying said optical element; a pair of elongated rods fixed to said barrel at the exterior thereof and respectively located in and extending longitudinally of said cutouts, said rods respectively having longitudinal axes which are substantially parallel to the optical axis and each rod having an exterior convex surface of revolution whose axis coincides with the rod axis and the exterior convex surface of revolution of each rod engaging the parallel flat surfaces of the cutout in which the rod is located, so that said rods provide said barrel with two degrees of freedom, namely freedom to move longitudinally along said optical axis and freedom to be transversely displaced in said tubular support; and means projecting from said barrel and engaging said tubular support for eliminating said freedom to move transversely, so that said barrel is limited to longitudinal movement with respect to said tubular support along the optical axis.

2. In an optical device having an optical axis, in combination, an outer tubular support having a longitudinal axis substantially coinciding with said optical axis and formed with a pair of longitudinal cutouts angularly displaced with respect to each other about the optical axis, communicating with the interior of said tubular support, and each defined at least in part by a pair of parallel flat surfaces of said tubular support extending substantially parallel to the optical axis; an optical element having an optical axis coinciding with said predetermined optical axis of the device; a barrel located within and spaced from said tubular support and carrying said optical element; a pair of elongated rods fixed to said barrel and respectively situated in said cutouts and extending longitudinally thereof, said rods respectively having longitudinal axes respectively parallel to said optical axis and each having an exterior convex surface of revolution extending around its longitudinal axis and engaging the flat surfaces of the cutout in which said rod is located, so that said rods and tubular support provide said barrel with two degrees of freedom, namely freedom to move along the optical axis and freedom to move transversely of said optical axis; and means fixed to said barrel, projecting therefrom, and engaging said tubular support for eliminating said freedom to move transversely of said optical axis, so that said barrel is constrained to move only along said optical axis relative to said tubular support.

3. In a device as recited in claim 2, said means for eliminating said freedom to move transversely of said optical axis including a projection fixed to and projecting substantially radially from said barrel and a wall portion of said tubular support formed with a longitudinal cutout extending substantially parallel to the optical axis and receiving said projection, the latter having a width substantially equal to that of said latter cutout.

4. In a device as recited in claim 2, said means for eliminating said freedom to move transversely of said optical axis including a plurality of projections fixed to and projecting from said barrel and engaging the inner surface of said tubular support.

5. In a device as recited in claim 2, said means for eliminating said freedom to move transversely of said optical axis including a third elongated rod extending longitudinally of and carried by said barrel at the exterior thereof and a wall portion of said tubular support formed with a longitudinal cutout receiving said third rod, the latter having a width substantially equal to that of the cutout into which it extends.

6. In an optical device having a predetermined optical axis, in combination, an outer elongated tubular support having a longitudinal axis substantially coinciding with the optical axis and formed with a pair of longitudinal cutouts extending substantially parallel to the optical axis, angularly displaced with respect to each other about said optical axis, communicating with the interior of said tubular support, and each being defined at least in part by a pair of flat parallel surfaces which are substantially parallel to the optical axis; an optical element having an optical axis coinciding with said predetermined optical axis of the device; a barrel located within and spaced from said tubular support and carrying said optical element; a pair of elongated cylindrical rods extending substantially parallel to the optical axis, fixed to said barrel at the exterior thereof, respectively located in said cutouts, and each having an exterior convex cylindrical surface respectively engaging the parallel flat surfaces which define at least in part the cutout in which it is located, so that said rods provide said barrel with two degrees of freedom, namely a first freedom to move along the optical axis and a second freedom to move transversely of said optical axis; and means projecting from said barrel and engaging said tubular support for eliminating said second freedom, so that said barrel is constrained to move only along said optical axis.

7. In a device as recited in claim 6, said cylindrical rods being of substantially uniform cross section along their entire lengths.

8. In a device as recited in claim 6, each cylindrical rod having a pair of opposed end portions and an intermediate portion extending between said end portions and being of a smaller diameter than said end portions.

9. In a device as recited in claim 8, said end portions of each rod being of a constant diameter.

10. In a device as recited in claim 8, said end portions of each rod respectively having substantially the configuration of part of a solid of revolution other than a cylinder and said solids of revolution at said end portions of each rod having a common axis coinciding with the axis of said cylindrical rod.

11. In an optical device having a predetermined optical axis, in combination, an outer stationary tubular support having a longitudinal axis substantially coinciding with the optical axis, said tubular support being formed with a pair of elongated cutouts angularly displaced with respect to each other about the optical axis, extending generally parallel thereto, and communicating with the interior of said tubular support, each of said cutouts being defined at least in part by a pair of flat parallel surfaces of said support extending substantially parallel to the optical axis; an optical element having an optical axis coinciding with said predetermined optical axis of the device; an inner barrel located within and spaced from said tubular support and carrying said optical element; a pair of elongated rods fixed to said barrel at the exterior thereof and respectively located in and extending longitudinally of said cutouts, said rods respectively having longitudinal axes which are substantially parallel to the optical axis and each rod having an exterior convex surface of revolution whose axis coincides with the rod axis and the exterior convex surface of revolution of each rod engaging the parallel flat surfaces of the cutout in which the rod is located, so that said rods provide said barrel with two degrees of freedom, namely freedom to move longitudinally along said optical axis and freedom to be transversely displaced in said tubular support; means projecting from said barrel and engaging said tubular support for eliminating said freedom to move transversely, so that said barrel is limited to longitudinal movement with respect to said tubular support along the optical axis; and means operatively connected to said barrel for moving the latter along said optical axis.

12. In an optical device having a predetermined optical axis, in combination, a stationary outer tubular support of substantially cylindrical configuration having a longitudinal axis substantially coinciding with the optical axis and formed with a pair of longitudinal cutouts extending substantially parallel to the optical axis and angularly displaced with respect to each other about the optical axis by less than 180°, said cutouts communicating with the interior of said tubular support and each being defined at least in part by a pair of longitudinal parallel flat surfaces of said tubular support which extend substantially radially with respect to the axis thereof; an optical element having an optical axis coinciding with said predetermined optical axis of the device; a barrel located within and spaced from said tubular support and carrying said optical element; a pair of elongated cylindrical rods fixed to the barrel at the exterior thereof, respectively located within said cutouts, respectively extending substantially parallel to said optical axis, and respectively having exterior convexly curved substantially cylindrical surfaces engaging said flat surfaces, so that said rods and tubular support provide said barrel with two degrees of freedom, namely a first freedom to move along said optical axis and a second freedom to move transversely of said optical axis; and means projecting from said barrel and engaging said tubular support for eliminating said second freedom, so that said barrel is constrained to move only along said optical axis.

References Cited by the Examiner

UNITED STATES PATENTS

| | | | |
|---|---|---|---|
| 1,898,905 | 2/1933 | Seitz | 88—57 |
| 1,950,166 | 3/1934 | Durholz | 88—57 |
| 1,988,390 | 1/1935 | Naumann | 88—57 |
| 2,873,646 | 2/1959 | Angenieux | 88—57 |
| 3,090,282 | 5/1963 | Angenieux | 88—57 |

FOREIGN PATENTS 107,245   3/1926   Austria.

JEWELL H. PEDERSEN, *Primary Examiner.*

J. S. GOLDHAMMER, J. K. CORBIN,
*Assistant Examiners.*